(12) United States Patent
Yang

(10) Patent No.: US 12,289,648 B2
(45) Date of Patent: Apr. 29, 2025

(54) NETWORK SLICE RESELECTION METHOD AND DEVICE, ELECTRONIC DEVICE AND STORAGE MEDIUM

(71) Applicant: ZTE CORPORATION, Guangdong (CN)

(72) Inventor: Haicheng Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 329 days.

(21) Appl. No.: 17/922,616

(22) PCT Filed: Apr. 20, 2021

(86) PCT No.: PCT/CN2021/088339
§ 371 (c)(1),
(2) Date: Nov. 1, 2022

(87) PCT Pub. No.: WO2021/244165
PCT Pub. Date: Dec. 9, 2021

(65) Prior Publication Data
US 2023/0224780 A1 Jul. 13, 2023

(30) Foreign Application Priority Data

Jun. 1, 2020 (CN) .......................... 202010487424.0

(51) Int. Cl.
*H04W 36/14* (2009.01)
*H04W 36/24* (2009.01)
*H04W 36/38* (2009.01)

(52) U.S. Cl.
CPC .......... *H04W 36/14* (2013.01); *H04W 36/24* (2013.01); *H04W 36/38* (2013.01)

(58) Field of Classification Search
CPC ..... H04W 36/14; H04W 36/24; H04W 36/38; H04W 36/13; H04W 48/18; H04W 76/18; H04W 76/10; H04W 76/30
(Continued)

(56) References Cited

U.S. PATENT DOCUMENTS 10,602,422 B1 * 3/2020 Jagannatha ......... H04L 41/5041
10,743,250 B2   8/2020 Watfa et al.
(Continued)

FOREIGN PATENT DOCUMENTS

CN   108029062 A   5/2018
CN   109565746 A   4/2019
(Continued)

OTHER PUBLICATIONS

Japan Patent Office, JP2022-548024 First Office Action issued on Sep. 19, 2023.
(Continued)

*Primary Examiner* — Marcos Batista
(74) *Attorney, Agent, or Firm* — Li & Cai Intellectual Property (USA) Office

(57) ABSTRACT

The present disclosure provides a network slice reselection method, including: receiving a message sent from a network side for a currently selected network slice, and reselecting a network slice; and a reason carried by the message is insufficient resource. The present disclosure further provides a network slice reselection device, an electronic device and a computer-readable storage medium.

16 Claims, 6 Drawing Sheets

(58) Field of Classification Search
USPC .......................................... 370/331; 455/312
See application file for complete search history.

(56) References Cited

U.S. PATENT DOCUMENTS

| | | | |
|---|---|---|---|
| 10,979,955 B2 | 4/2021 | Vrzic | |
| 2017/0086118 A1* | 3/2017 | Vrzic | H04W 36/26 |
| 2018/0324663 A1 | 11/2018 | Park | |
| 2020/0053622 A1 | 2/2020 | Huang-Fu | |
| 2020/0162919 A1 | 5/2020 | Velev | |
| 2021/0029628 A1* | 1/2021 | Kim | H04W 48/18 |
| 2022/0201563 A1* | 6/2022 | Li | H04W 36/00695 |

FOREIGN PATENT DOCUMENTS

| | | |
|---|---|---|
| CN | 110062407 A | 7/2019 |
| CN | 110167064 A | 8/2019 |
| JP | 2019520771 A | 7/2019 |
| WO | WO 2019074347 A1 | 4/2019 |
| WO | WO 2019216526 A1 | 11/2019 |

OTHER PUBLICATIONS

European Patent Office, EP21818518.9 Extended European Search Report issued on Aug. 30, 2023.
"3rd Generation Partnership Project; Technical Specification Group Services and System Aspects; Policy and Charging control framework for the 5G system (5GS); Stage 2 (Release 16)", 3GPP Standard, issued on Apr. 6, 2020.
WIPO, International Search Report issued on Jul. 1, 2021.
Spreadtrum Communications. "Cell Reselection Based on Slice Information," 3GPP TSG-RAN WG2#99, Berlin, Germany, Aug. 25, 2017.
Huawei, Hisilicon. "Slice Availability for Cell Reselection," 3GPP TSG-RAN WG2 Meeting#101, Athens, Greece, Mar. 2, 2018.

* cited by examiner

NETWORK SLICE RESELECTION METHOD AND DEVICE, ELECTRONIC DEVICE AND STORAGE MEDIUM

TECHNICAL FIELD

Embodiments of the present disclosure relate to, but are not limited to, the wireless communication field.

BACKGROUND

A 2G/3G/4G network merely meets single-service requirements, such as making a call or surfing on the internet, but cannot meet new service requirements due to explosive growth of data services.

Aiming for multi-connection and diversified services, a 5G network needs to be capable of being flexibly deployed like building blocks, so as to allow new services to be conveniently and quickly online or offline, thereby meeting people's growing requirements of the data services. It is widely believed in the industry that network slices can implement multi-scenario and diversified 5G services and have indispensable importance in various 5G technologies.

Essentially, the network slicing technology is to divide a physical network of an operator into a plurality of virtual networks, which are divided according to different service requirements such as latency, bandwidth, security, reliability and the like, so as to flexibly cope with different network application scenarios.

However, congestion of the network slices is still unavoidable in a densely-populated area.

SUMMARY

The embodiments of the present disclosure provide a network slice reselection method and device, an electronic device and a computer-readable storage medium.

In a first aspect, an embodiment of the present disclosure provides a network slice reselection method, including: receiving a message sent from a network side for a currently selected network slice, and reselecting a network slice; wherein a reason carried by the message is insufficient resource.

In a second aspect, an embodiment of the present disclosure provides an electronic device, including: at least one processor; and a memory having at least one program stored thereon. When the at least one program is executed by the at least one processor, the at least one processor is caused to implement the network slice reselection method described herein.

In a third aspect, an embodiment of the present disclosure provides a computer-readable storage medium having a computer program stored thereon. The computer program, when executed by a processor, causes the processor to implement the network slice reselection method described herein.

DETAIL DESCRIPTION OF EMBODIMENTS

In order to enable those of ordinary skill in the art to better understand the technical solutions of the present disclosure, a network slice reselection method and device, an electronic device, and a computer-readable storage medium provided by the present disclosure will be described in detail below with reference to the drawings.

Exemplary embodiments of the present disclosure will be described more fully below with reference to the drawings, but the exemplary embodiments described herein may be embodied in different forms and should not be interpreted as being limited to the embodiments described herein. Rather, the embodiments are provided to make the present disclosure thorough and complete, and are intended to enable those of ordinary skill in the art to fully understand the scope of the present disclosure.

The embodiments of the present disclosure and the features thereof can be combined with one another if no conflict is incurred.

The term "and/or" used herein includes one associated listed item or any and all combinations of one or more of the associated listed items.

The terms used herein are merely used to describe specific embodiments, and are not intended to limit the present disclosure. As used herein, "a" and "the" which indicate a singular form are intended to include a plural form, unless expressly stated in the context. It should be further understood that the term(s) "comprise" and/or "be made of" used herein indicate(s) the presence of the described features, integers, operations, elements and/or components, but do not exclude the presence or addition of at least one of other features, integers, operations, elements, components and/or combinations thereof.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

Although the embodiments of the present disclosure set forth a processing method based on the congestion of the network slices in the 5G network, the processing method for the congestion set forth by the embodiments of the present disclosure is also applicable to a future communication network (such as a 6G network or a 7G network), or any other communication network implemented by the network slicing technology.

Figure 1:
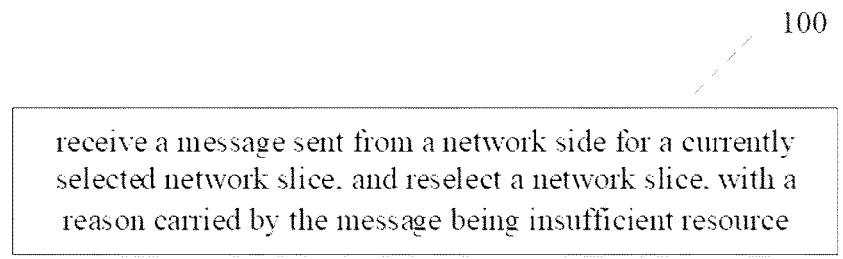
FIG. 1 is a flowchart illustrating a network slice reselection method according to an embodiment of the present disclosure.

FIG. 1 is a flowchart illustrating a network slice reselection method according to an embodiment of the present disclosure.

In a first aspect, with reference to FIG. 1, an embodiment of the present disclosure provides a network slice reselection method applied to a terminal (for example, the method is performed by the terminal), and the method may include: operation 100, receiving a message sent from a network side for a currently selected network slice, and reselecting a network slice, with a reason carried by the message being insufficient resource.

In some exemplary embodiments, if no message sent from the network side for the currently selected network slice is received, or the message sent from the network side for the currently selected network slice is received but the reason carried by the message is not insufficient resource, it is regarded that no network congestion happens to the currently selected network slice, and the process is ended.

According to the network slice reselection method provided by the embodiments of the present disclosure, when the message sent from the network side for the currently selected network slice is received, it is regarded that the network congestion happens to the currently selected network slice, and the network slice is reselected. Thus, the network congestion of the currently selected network slice is alleviated while ensuring that the terminal can continue to perform a service through the reselected network slice, which improves user experience.

In some exemplary embodiments, the message includes any one of: a Protocol Data Unit (PDU) Session Establishment Reject message, a PDU Session Modification Reject message, and a PDU Session Release message.

It should be noted that the "PDU Session Establishment Reject message", the "PDU Session Modification Reject message" and the "PDU Session Release message" are message names in the 5G network. With the development of network technology, the message may be a message having the same function but a different name in a future communication system, or another message having the same function in the future communication system. The specific name of the message is not limited in the embodiments of the present disclosure.

In some exemplary embodiments, selection of the network slice is achieved by finding a matched available User Equipment Route Selection Policy (URSP) rule in a list of URSP rules.

In some exemplary embodiments, the list of URSP rules includes: a list of URSP rules which is pre-configured in the terminal before leaving factory, and a list of URSP rules which is updated according to the network side. A priority level of the list of URSP rules updated according to the network side is higher than that of the list of URSP rules pre-configured in the terminal before leaving factory.

In some exemplary embodiments, the matched available URSP rule may be found in the list of URSP rules according to a network slice parameter of an application, so as to obtain S-NSSAI of the network slice.

In some exemplary embodiments, the network slice parameter includes, but is not limited to, at least one of: Data Network Name (DNN), application identifier or Fully Qualified Domain Name (FQDN).

Briefly, an input parameter to the URSP rule is at least one of the DNN, the application identifier, or the FQDN, and an output parameter from the URSP rule is the S-NSSAI.

Figure 2:
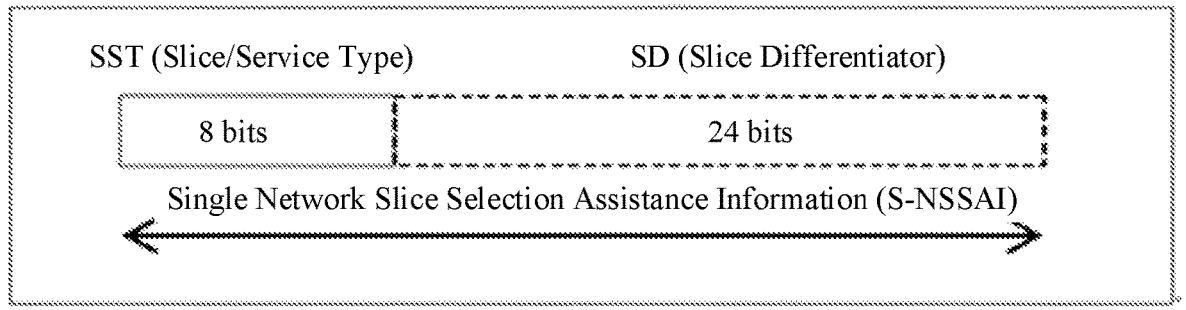
FIG. 2 is a schematic structural diagram of Single Network Slice Selection Assistance Information (S-NSSAI) according to an embodiment of the present disclosure.

In some exemplary embodiments, the S-NSSAI identifies one network slice. As shown in FIG. 2, the S-NSSAI includes two following parts: Slice/Service Type (SST) and Slice Differentiator (SD).

The SST represents an expected network slice behavior in terms of functions and services, and may be a standard value (such as Enhanced Mobile Broadband (eMBB), Ultra-Reliable and Low-Latency Communications (URLLC) or Massive Internet of Things (MIoT)), or may be a non-standard value.

The SST is 1 byte long, a range of the standard values of the SST (only three standard values are used in the current protocols, as shown in Table 1) is from 0 to 127, and a range of values defined by operators is from 128 to 255. The values defined by the operators are merely valid in local networks, and the standard values are universal in all networks.

The SD is optional information for supplementing the SST to distinguish between a plurality of network slices corresponding to the same SST.

TABLE 1

| SST | SST Value | Characteristics |
|---|---|---|
| eMBB | 1 | network slice applicable to 5G eMBB |
| URLLC | 2 | network slice applicable to URLLC |
| MIoT | 3 | network slice applicable to MIoT |

Reselection processes of the network slice in two cases are respectively described below.

In the first case, the terminal is a single card user. In such case, the terminal has merely one list of URSP rules, i.e., a first list of URSP rules described below.

In some exemplary embodiments, after receiving the message sent from the network side for the currently selected network slice and before reselecting the network slice, the method further includes: identifying a URSP rule corresponding to the currently selected network slice as "unavailable"; accordingly, reselecting the network slice includes: finding a matched URSP rule which is not identified as "unavailable" in the first list of URSP rules or finding a matched URSP rule which is identified as "available" in the first list of URSP rules, and reselecting a network slice corresponding to the matched available URSP rule.

In some exemplary embodiments, either of the following ways may be adopted in order to ensure that the URSP rule identified as "unavailable" may be subsequently selected and used again by the terminal.

In Way One, the URSP rule corresponding to the currently selected network slice is identified as "unavailable" within a preset period of time; and after the preset period of time ends, the identification of "unavailable" of the URSP rule is removed, or the URSP rule is identified as "available". For example, a timer may be set; when the timer is started, the URSP rule corresponding to the currently selected network slice is identified as "unavailable"; and when the timer times out, the identification of "unavailable" of the URSP rule is removed, or the URSP rule is identified as "available".

In Way Two, it is detected whether network congestion happens to the network slice corresponding to the URSP rule identified as "unavailable"; if it is detected that no network congestion happens to the network slice corresponding to the URSP rule identified as "unavailable", the identification of "unavailable" of the URSP rule is removed, or the URSP rule is identified as "available"; and if it is detected that the network congestion happens to the network slice corresponding to the URSP rule identified as "unavailable", the identification of "unavailable" of the URSP rule is kept.

In the second case, the terminal is a dual-card or multi-card user. In such case, each card of the terminal corresponds to one list of URSP rules, such as a first list of URSP rules or a second list of URSP rules described below.

In some exemplary embodiments, after receiving the message sent from the network side for the currently selected network slice and before reselecting the network slice, the method further includes: identifying a URSP rule corresponding to the currently selected network slice as "unavailable"; accordingly, reselecting the network slice includes: finding a matched URSP rule which is not identified as "unavailable" in the first list of URSP rules or finding a matched URSP rule which is identified as "available" in the first list of URSP rules, and reselecting a network slice corresponding to the matched available URSP rule.

In some other exemplary embodiments, when the matched available URSP rule is not found in the first list of URSP rules, reselecting the network slice further includes: reselecting a network slice corresponding to an available URSP rule in the second list of URSP rules. The first list of URSP rules is a list of URSP rules corresponding to a card which currently performs service processing, and the second list of URSP rules is a list of URSP rules corresponding to a card which does not currently perform service processing.

Exemplarily, a matched URSP rule which is not identified as "unavailable" or a matched URSP rule which is identified as "available" may be found in the second list of URSP rules, and a network slice corresponding to the matched available URSP rule may be reselected.

That is, the terminal may traverse all the lists of URSP rules, and the process is ended when the matched available URSP rule cannot be found in all the lists of URSP rules.

In some exemplary embodiments, either of the following ways may be adopted in order to ensure that the URSP rule identified as "unavailable" may be subsequently selected and used again by the terminal.

In Way One, the URSP rule corresponding to the currently selected network slice is identified as "unavailable" within a preset period of time; and after the preset period of time ends, the identification of "unavailable" of the URSP rule is removed, or the URSP rule is identified as "available". For example, a timer may be set; when the timer is started, the URSP rule corresponding to the currently selected network slice is identified as "unavailable"; and when the timer times out, the identification of "unavailable" of the URSP rule is removed, or the URSP rule is identified as "available".

In Way Two, it is detected whether network congestion happens to the network slice corresponding to the URSP rule identified as "unavailable"; if it is detected that no network congestion happens to the network slice corresponding to the URSP rule identified as "unavailable", the identification of "unavailable" of the URSP rule is removed, or the URSP rule is identified as "available"; and if it is detected that the network congestion happens to the network slice corresponding to the URSP rule identified as "unavailable", the identification of "unavailable" of the URSP rule is kept.

Exemplary implementation processes of the above embodiments are illustrated in detail below by exemplary examples, and the examples described herein are merely for convenience of description, and are not intended to limit the scope of the embodiments of the present disclosure.

Example One

Figure 3:
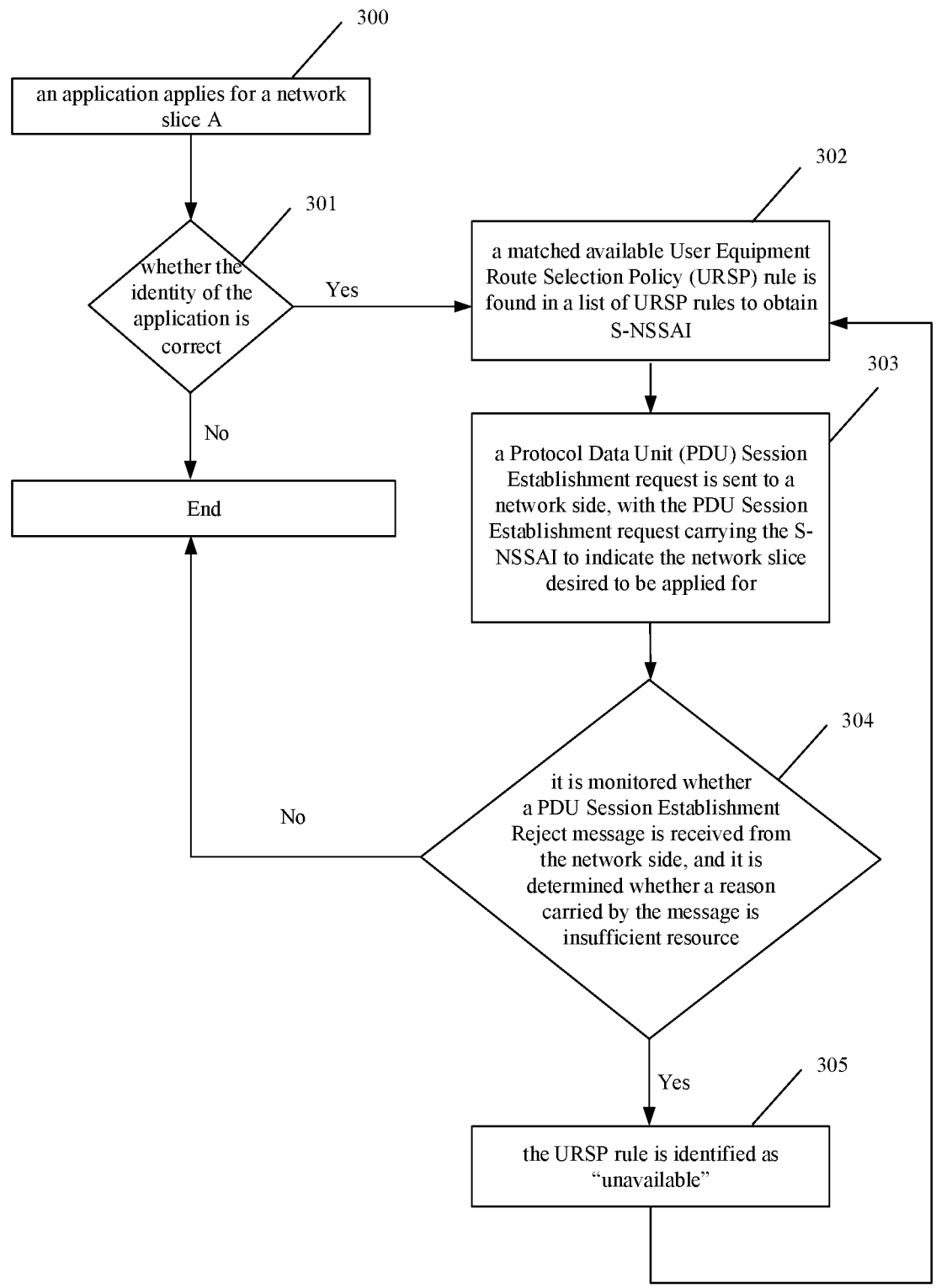
FIG. 3 is a flowchart illustrating a network slice reselection method according to Example One of the embodiments of the present disclosure.

As shown in FIG. 3, the network slice reselection method may include operations 300 to 305.

In operation 300, an application applies for a network slice A.

In operation 301, it is determined whether the identity of the application is correct, and the operation 302 is then executed if the identity of the application is correct; and the process is ended if the identity of the application is not correct.

In some exemplary embodiments, whether the identity of the application is correct may be determined according to at least one of an application identifier, an application package name or an application signature.

In operation 302, a matched available URSP rule is found in a list of URSP rules to obtain S-NSSAI.

In some exemplary embodiments, the matched available URSP rule may be found in the list of URSP rules according to a network slice parameter of the application, thus obtaining S-NSSAI of a network slice.

In some exemplary embodiments, the network slice parameter includes, but is not limited to, at least one of: the DNN, the application identifier or the FQDN.

Briefly, an input parameter to the URSP rule is at least one of the DNN, the application identifier or the FQDN, and an output parameter is the S-NSSAI.

In operation 303, a PDU Session Establishment request is sent to a network side, with the PDU Session Establishment request carrying the S-NSSAI to indicate the network slice desired to be applied for.

In operation 304, it is monitored whether a PDU Session Establishment Reject message is received from the network side, and it is determined whether a reason carried by the message is insufficient resource; if the PDU Session Establishment Reject message is received and the reason carried thereby is insufficient resource, the operation 305 is then executed; and if no PDU Session Establishment Reject message is received, or the PDU Session Establishment Reject message is received but the reason carried thereby is not insufficient resource, the process is ended.

In operation 305, the URSP rule is identified as "unavailable", and the operation 302 is then executed.

Example Two

Figure 4:
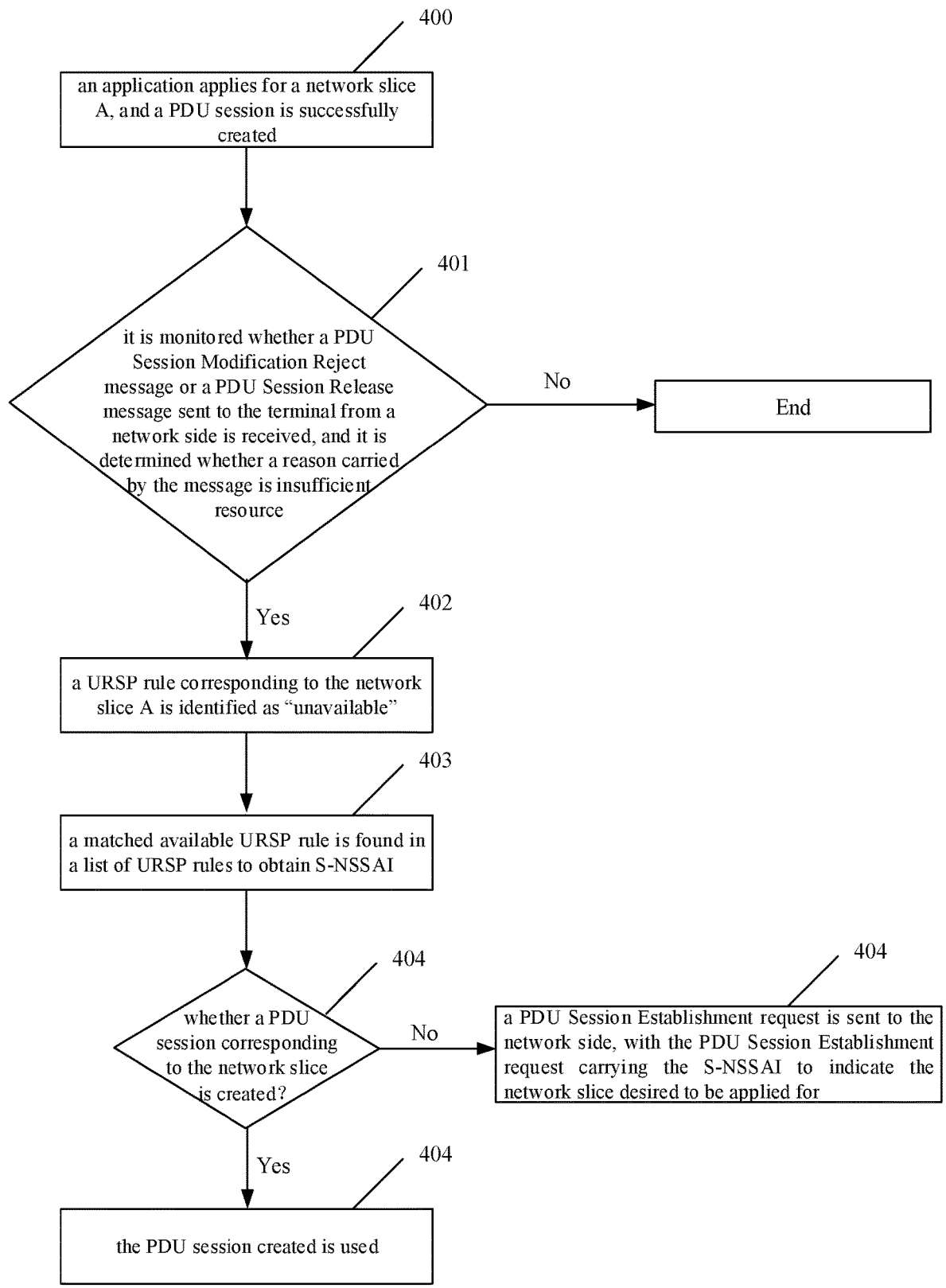
FIG. 4 is a flowchart illustrating a network slice reselection method according to Example Two of the embodiments of the present disclosure.

As shown in FIG. 4, the network slice reselection method may include operations 400 to 404.

In operation 400, an application applies for a network slice A, and a PDU session is successfully created.

In operation 401, it is monitored whether a PDU Session Modification Reject message or a PDU Session Release message sent to the terminal from a network side is received, and it is determined whether a reason carried by the message is insufficient resource; if the PDU Session Modification Reject message or the PDU Session Release message sent to the terminal from the network side is received and the reason carried thereby is insufficient resource, the operation 402 is then executed; and if no PDU Session Modification Reject message or no PDU Session Release message is received, or the PDU Session Modification Reject message or the PDU Session Release message sent to the terminal from the network side is received but the reason carried thereby is not insufficient resource, the process is ended.

In operation 402, a URSP rule corresponding to the network slice A is identified as "unavailable".

In operation 403, a matched available URSP rule is found in a list of URSP rules to obtain S-NSSAI.

In operation 404, it is determined whether a PDU session corresponding to the network slice is created; if the PDU session corresponding to the network slice is created, the PDU session created is used; and if the PDU session corresponding to the network slice is not created, a PDU Session Establishment request is sent to the network side, with the PDU Session Establishment request carrying the S-NSSAI to indicate the network slice desired to be applied for.

Example Three

The present example illustrates a method for handling congestion in a dual-card (two Subscriber Identity Module (SIM) cards from different operators) scenario where it is assumed that a data service of a SIM card 1 is currently involved. When network slice reselection is performed, it is found that a network slice in a 5G network of a SIM card 2 is available, so that the terminal switches the data service to the SIM card 2, and creates a PDU session with a specified network slice after successfully registering in the 5G network.

Figure 5:
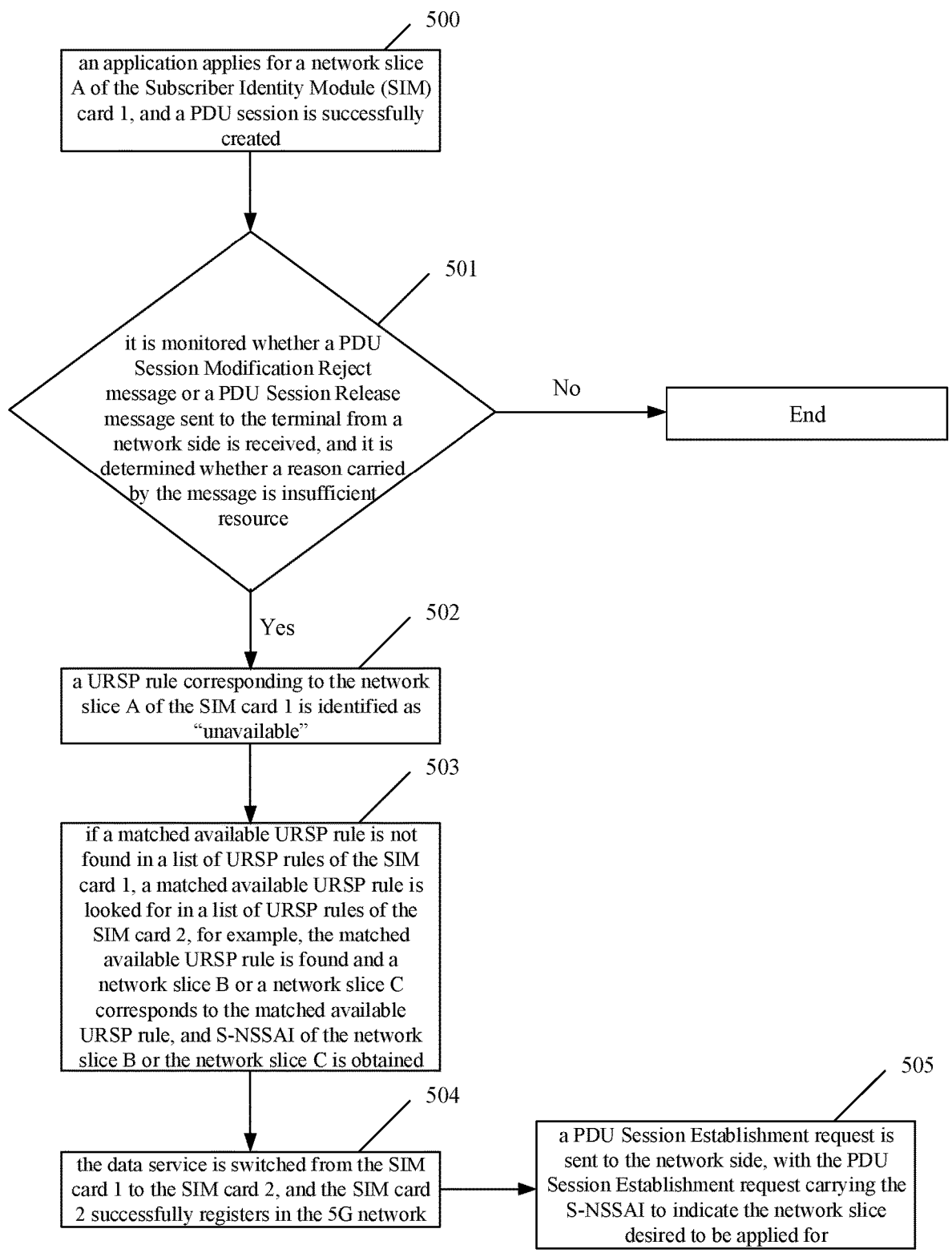
FIG. 5 is a flowchart illustrating a network slice reselection method according to Example Three of the embodiments of the present disclosure.

As shown in FIG. 5, the method may include operations 500 to 505.

In operation 500, an application applies for a network slice A of the SIM card 1, and a PDU session is successfully created.

In operation 501, it is monitored whether a PDU Session Modification Reject message or a PDU Session Release message sent to the terminal from a network side is received, and it is determined whether a reason carried by the message is insufficient resource; if the PDU Session Modification Reject message or the PDU Session Release message sent to the terminal from the network side is received and the reason carried thereby is insufficient resource, the operation 502 is then executed; and if no PDU Session Modification Reject message or no PDU Session Release message is received, or the PDU Session Modification Reject message or the PDU Session Release message sent to the terminal from the network side is received but the reason carried thereby is not insufficient resource, the process is ended.

In operation 502, a URSP rule corresponding to the network slice A of the SIM card 1 is identified as "unavailable".

In operation 503, if a matched available URSP rule is not found in a list of URSP rules of the SIM card 1, a matched available URSP rule is looked for in a list of URSP rules of the SIM card 2, for example, the matched available URSP rule is found and a network slice B or a network slice C corresponds to the matched available URSP rule, and S-NSSAI of the network slice B or the network slice C is obtained.

In operation 504, the data service is switched from the SIM card 1 to the SIM card 2, and the SIM card 2 successfully registers in the 5G network.

In operation 505, a PDU Session Establishment request is sent to the network side, with the PDU Session Establishment request carrying the S-NSSAI to indicate the network slice desired to be applied for.

Example Four

The present example illustrates a method for handling congestion in a dual-card (two SIM cards from different operators) scenario where it is assumed that a data service of a SIM card 1 is currently involved. When network slice reselection is performed, it is found that a network slice in a 5G network of a SIM card 2 is available, so that the SIM card 1 of the terminal tries to register in the 5G network of the SIM card 2, and a PDU session with a specified network slice is created after the SIM card 1 successfully registers in the 5G network of the SIM card 2 (that is, a scenario where the SIM card 1 roams to the network of the SIM card 2).

Figure 6:
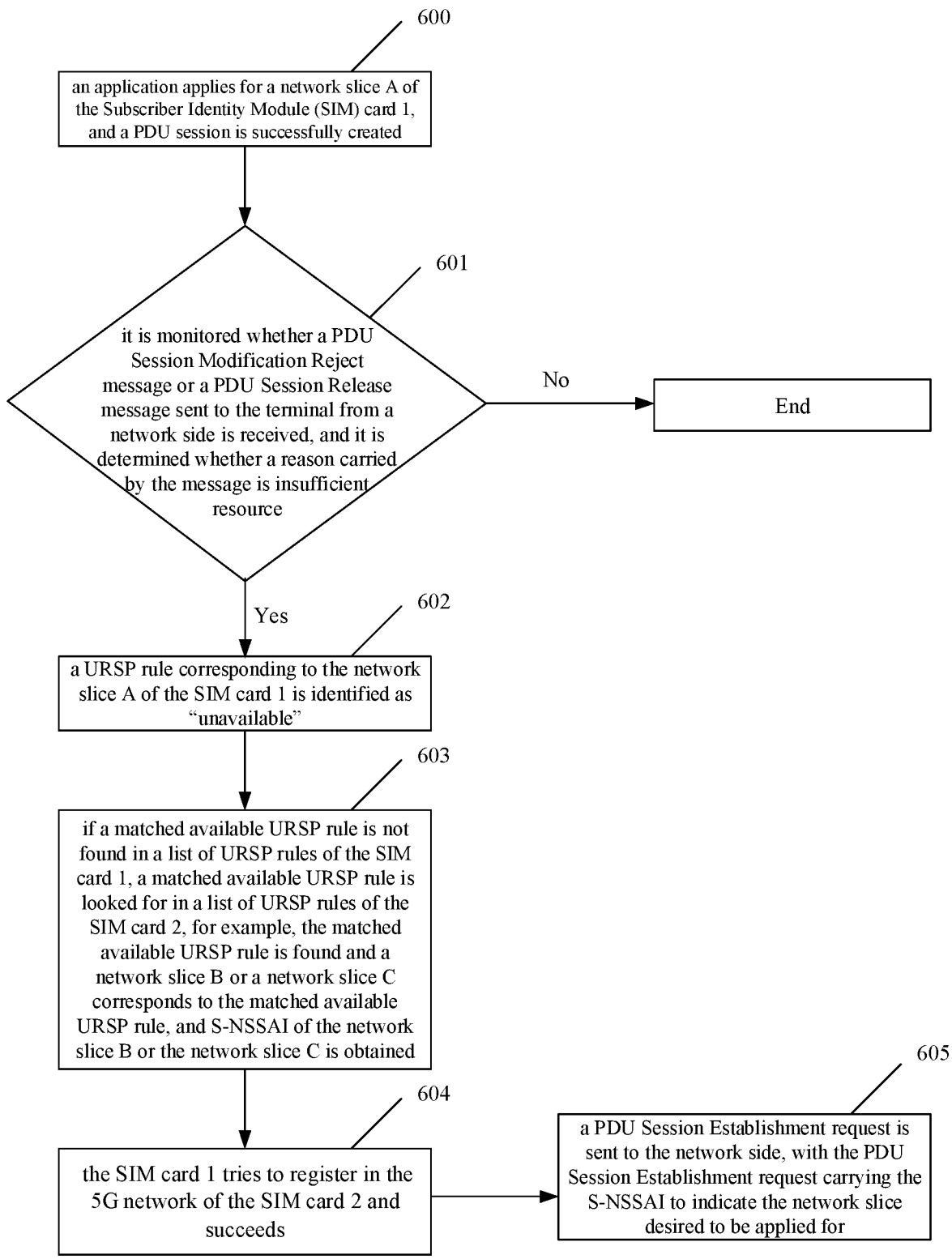
FIG. 6 is a flowchart illustrating a network slice reselection method according to Example Four of the embodiments of the present disclosure.

As shown in FIG. 6, the method may include operations 600 to 605.

In operation 600, an application applies for a network slice A of the SIM card 1, and a PDU session is successfully created.

In operation 601, it is monitored whether a PDU Session Modification Reject message or a PDU Session Release message sent to the terminal from a network side is received, and it is determined whether a reason carried by the message is insufficient resource; if the PDU Session Modification Reject message or the PDU Session Release message sent to the terminal from the network side is received and the reason carried thereby is insufficient resource, the operation 602 is then executed; and if no PDU Session Modification Reject message or no PDU Session Release message is received, or the PDU Session Modification Reject message or the PDU Session Release message sent to the terminal from the network side is received but the reason carried thereby is not insufficient resource, the process is ended.

In operation 602, a URSP rule corresponding to the network slice A of the SIM card 1 is identified as "unavailable".

In operation 603, if a matched available URSP rule is not found in a list of URSP rules of the SIM card 1, a matched available URSP rule is looked for in a list of URSP rules of the SIM card 2, for example, the matched available URSP rule is found and a network slice B or a network slice C corresponds to the matched available URSP rule, and S-NSSAI of the network slice B or the network slice C is obtained.

In operation 604, the SIM card 1 tries to register in the 5G network of the SIM card 2 and succeeds.

In operation 605, a PDU Session Establishment request is sent to the network side, with the PDU Session Establishment request carrying the S-NSSAI to indicate the network slice desired to be applied for.

In a second aspect, an embodiment of the present disclosure provides an electronic device, including: at least one processor; and a memory having at least one program stored thereon. When the at least one program is executed by the at least one processor, the at least one processor is caused to implement the network slice reselection method of any one of the above embodiments.

The processor is a device having data processing capability, and includes, but is not limited to, a Central Processing Unit (CPU); and the memory is a device having data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH).

In some embodiments, the processor and the memory are connected to each other through a bus, and then are connected to other components of a computing device.

In a third aspect, an embodiment of the present disclosure provides a computer-readable storage medium having a computer program stored thereon. The computer program, when executed by a processor, causes the processor to implement the network slice reselection method of any one of the above embodiments.

Figure 7:
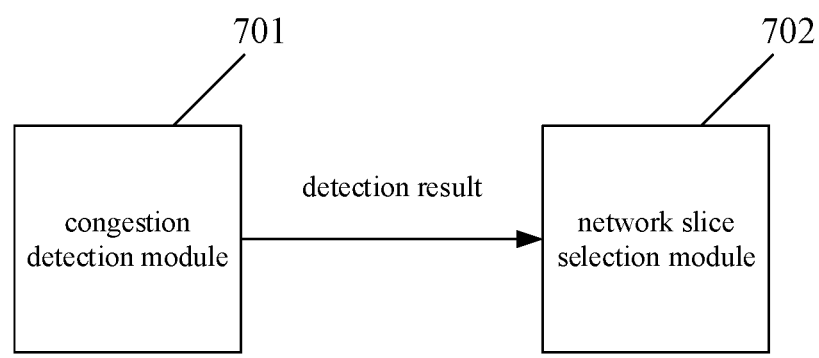
FIG. 7 is a block diagram of a network slice reselection device according to an embodiment of the present disclosure.

FIG. 7 is a block diagram of a network slice reselection device according to an embodiment of the present disclosure.

In a fourth aspect, with reference to FIG. 7, an embodiment of the present disclosure provides a network slice reselection device, including: a congestion detection module 701 configured to monitor whether a message sent from a network side for a currently selected network slice is received, and determine whether a reason carried by the message is insufficient resource; and a network slice selection module 702 configured to reselect a network slice when the congestion detection module 701 receives the message sent from the network side for the currently selected network slice, and the reason carried by the message is insufficient resource.

In some exemplary embodiments, the message includes any one of: a PDU Session Establishment Reject message, a PDU Session Modification Reject message, and a PDU Session Release message.

In some exemplary embodiments, the network slice selection module 702 may be configured to identify a URSP rule corresponding to the currently selected network slice as "unavailable" when the congestion detection module 701 receives the message sent from the network side for the currently selected network slice and the reason carried by the message is insufficient resource, find a matched URSP rule which is not identified as "unavailable" in a first list of URSP rules or find a matched URSP rule which is identified as "available" in the first list of URSP rules, and reselect a network slice corresponding to the matched available URSP rule.

In some exemplary embodiments, the network slice selection module 702 may be configured to take the following way to identify the URSP rule corresponding to the currently selected network slice as "unavailable": identifying the URSP rule corresponding to the currently selected network slice as "unavailable" within a preset period of time; and after the preset period of time ends, removing the identification of "unavailable" of the URSP rule, or identifying the URSP rule as "available".

In some exemplary embodiments, the network slice selection module 702 is further configured to detect whether network congestion happens to a network slice corresponding to the URSP rule identified as "unavailable", and remove the identification of "unavailable" of the URSP rule or identify the URSP rule as "available" when it is detected that no network congestion happens to the network slice corresponding to the URSP rule identified as "unavailable".

In some exemplary embodiments, the network slice selection module 702 is further configured to: reselect a network slice corresponding to an available URSP rule in a second list of URSP rules when the matched available URSP rule is not found in the first list of URSP rules.

The first list of URSP rules is a list of URSP rules corresponding to a card which currently performs service processing, and the second list of URSP rules is a list of URSP rules corresponding to a card which does not currently perform service processing.

A specific implementation process of the network slice reselection device is the same as the above specific implementation process of the embodiments of the network slice reselection method, and is thus not repeated here.

It should be understood by those of ordinary skill in the art that the functional modules/units in all or some of the operations, the systems and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, an RAM, an ROM, an EEPROM, a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure as defined the appended claims.

What is claimed is:

1. A network slice reselection method, comprising:
receiving a message sent from a network side for a currently selected network slice;
identifying a User Equipment Route Selection Policy (URSP) rule corresponding to the currently selected network slice as unavailable; and
reselecting a network slice, wherein a reason carried by the message is insufficient resource,
wherein identifying the URSP rule corresponding to the currently selected network slice as unavailable comprises:
identifying the URSP rule corresponding to the currently selected network slice as unavailable within a preset period of time; and
after the preset period of time ends, removing identification of unavailable of the URSP rule; or, after the preset period of time ends, identifying the URSP rule as available.

2. The method of claim 1, wherein reselecting the network slice comprises: finding a matched URSP rule which is not identified as unavailable in a first list of URSP rules or finding a matched URSP rule which is identified as available in the first list of URSP rules, and reselecting a network slice corresponding to the matched available URSP rule.

3. The method of claim 2, after reselecting the network slice corresponding to the matched available URSP rule, further comprising:
detecting whether network congestion happens to a network slice corresponding to the URSP rule identified as unavailable; and
removing identification of unavailable of the URSP rule or identifying the URSP rule as available when it is detected that no network congestion happens to the network slice corresponding to the URSP rule identified as unavailable.

4. An electronic device, comprising:
at least one processor; and
a memory having at least one program stored thereon, wherein, when the at least one program is executed by the at least one processor, the at least one processor is caused to implement the network slice reselection method of claim 2.

5. An electronic device, comprising:
at least one processor; and
a memory having at least one program stored thereon, wherein, when the at least one program is executed by the at least one processor, the at least one processor is caused to implement the network slice reselection method of claim 3.

6. The method of claim 1, when a matched available URSP rule is not found in a first list of URSP rules, reselecting the network slice further comprises:
reselecting a network slice corresponding to an available URSP rule in a second list of URSP rules;
wherein the first list of URSP rules is a list of URSP rules corresponding to a card which currently performs service processing, and the second list of URSP rules is a list of URSP rules corresponding to a card which does not currently perform service processing.

7. An electronic device, comprising:
at least one processor; and
a memory having at least one program stored thereon, wherein, when the at least one program is executed by the at least one processor, the at least one processor is caused to implement the network slice reselection method of claim 6.

8. The method of claim 1, wherein the message comprises any one of:
a Protocol Data Unit Session Establishment Reject message, a Protocol Data Unit Session Modification Reject message, and a Protocol Data Unit Session Release message.

9. An electronic device, comprising:
at least one processor; and
a memory having at least one program stored thereon, wherein, when the at least one program is executed by the at least one processor, the at least one processor is caused to implement the network slice reselection method of claim 1.

10. A non-transitory computer-readable storage medium having a computer program stored thereon which, when executed by a processor, cause the processor to implement the network slice reselection method of claim 1.

11. The method of claim 1, wherein the reselection of the network slice is achieved by finding a matched available User Equipment Route Selection Policy (URSP) rule in a list of URSP rules.

12. The method of claim 11, wherein the list of URSP rules comprises: a pre-configured list of URSP rules, and a list of URSP rules updated by a network side.

13. The method of claim 12, wherein a priority level of the list of URSP rules updated by the network side is higher than that of the pre-configured list of URSP rules.

14. The method of claim 11, wherein the matched available URSP rule is found in the list of URSP rules according to a network slice parameter of an application, so as to obtain Single Network Slice Selection Assistance Information (S-NSSAI) of the network slice.

15. The method of claim 14, the network slice parameter comprises at least one of: Data Network Name (DNN), application identifier or Fully Qualified Domain Name (FQDN).

16. The method of claim 14, wherein the S-NSSAI comprises: Slice/Service Type (SST) and Slice Differentiator (SD).

* * * * *